(12) United States Patent
Nobuoka et al.

(10) Patent No.: US 8,398,731 B2
(45) Date of Patent: Mar. 19, 2013

(54) FUEL TREATMENT DEVICE WITH GAS SUPPLY AND DIFFUSION REGIONS

(75) Inventors: Masaki Nobuoka, Nara (JP); Hiroyuki Nagai, Osaka (JP); Kazuya Shima, Shiga (JP); Miyuki Yoshimoto, Kyoto (JP); Masayasu Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 437 days.

(21) Appl. No.: 12/668,977

(22) PCT Filed: May 26, 2009

(86) PCT No.: PCT/JP2009/002322
§ 371 (c)(1),
(2), (4) Date: Jan. 13, 2010

(87) PCT Pub. No.: WO2009/144923
PCT Pub. Date: Dec. 3, 2009

(65) Prior Publication Data
US 2010/0183483 A1    Jul. 22, 2010

(30) Foreign Application Priority Data

May 30, 2008 (JP) .................................. 2008-143028

(51) Int. Cl.
*B01J 8/00* (2006.01)
(52) U.S. Cl. ............ 48/127.9; 48/61; 422/626; 429/420
(58) Field of Classification Search ........... 422/129–242
See application file for complete search history.

(56) References Cited

U.S. PATENT DOCUMENTS

2001/0029735 A1* 10/2001 Miura et al. .................... 60/512
2002/0042035 A1   4/2002 Komiya et al.

(Continued)

FOREIGN PATENT DOCUMENTS

| CA | 2521698 | 8/2005 |
|----|---------|--------|
| EP | 1197261 | 4/2002 |
| JP | 2003-226504 | 8/2003 |
| JP | 2004-262725 | 9/2004 |

(Continued)

OTHER PUBLICATIONS

English language Abstract of JP 2006-176398, Jul. 6, 2006.

(Continued)

*Primary Examiner* — Imran Akram
(74) *Attorney, Agent, or Firm* — Greenblum & Bernstein, P.L.C.

(57) ABSTRACT

A fuel treatment device includes: a reforming section that produces a hydrogen-rich gas containing carbon monoxide and water; a converting section that produces a hydrogen-rich gas containing a lower concentration of carbon monoxide by reacting the carbon monoxide and the water in the hydrogen-rich gas; a mixing channel that produces a mixed gas by mixing the hydrogen-rich gas containing the lower concentration of the carbon monoxide with air containing oxygen; an air supplying section that is connected to an upstream end of the mixing channel and supplies the air to the mixing channel; and a selective oxidizing section that is connected to a downstream end of the mixing channel and converts the mixed gas into a fuel gas by reacting the carbon monoxide and the oxygen in the mixed gas, wherein the mixing channel includes a gas supply region at the upstream side and a gas diffusion region at the downstream side, and has two or more gas supply ports connecting the gas supply region with the converting section, and a length of the gas diffusion region is 0.5 to 2 times a length of the gas supply region.

7 Claims, 13 Drawing Sheets

U.S. PATENT DOCUMENTS

| | | |
|---|---|---|
| 2004/0018134 A1 | 1/2004 | Liu et al. |
| 2004/0037758 A1 | 2/2004 | Pollica et al. |
| 2004/0068933 A1 | 4/2004 | Nakamura et al. |
| 2006/0083956 A1 | 4/2006 | Ukai et al. |
| 2007/0025892 A1* | 2/2007 | Kong et al. .................. 422/198 |

FOREIGN PATENT DOCUMENTS

| | | |
|---|---|---|
| JP | 2006-176398 | 7/2006 |
| WO | 00/32513 | 6/2000 |
| WO | 03-078311 | 9/2003 |
| WO | 03/106946 | 12/2003 |

OTHER PUBLICATIONS

English language Abstract of JP 2004-262725, Sep. 24, 2004.
English language Abstract of JP 2003-226504, Aug. 12, 2003.
Extended European Search Report from E.P.O., mailed May 16, 2012.

* cited by examiner

PRIOR ART

PRIOR ART

FUEL TREATMENT DEVICE WITH GAS SUPPLY AND DIFFUSION REGIONS

TECHNICAL FIELD

The present invention relates to a fuel treatment device for producing fuel gas for a fuel cell.

BACKGROUND ART

A fuel cell system such as a household cogeneration system has a fuel treatment device that produces fuel gas containing hydrogen and a fuel cell that generates power using the fuel gas produced by the fuel treatment device.

The fuel treatment device has a reforming section that produces hydrogen-rich gas containing hydrogen as a main component by steam-reforming reaction from steam and raw material gas such as hydrocarbon fuel, and a carbon monoxide removing section that removes carbon monoxide from the hydrogen-rich gas since carbon monoxide has an action of poisoning a catalyst of a fuel cell.

The carbon monoxide removing section also has: a converting section that decreases carbon monoxide concentration in the hydrogen-rich gas to about 0.5% by shift reaction of a CO converting catalysis; a selective oxidizing section that decreases the carbon monoxide concentration in the hydrogen-rich gas to about 10 ppm or less by selective oxidation reaction of a CO selective oxidation catalysis; and a mixing channel that connects the converting section and the selective oxidizing section. The mixing channel is a passage for mixing the hydrogen-rich gas exhausted from the converting section with air. For mixture of the hydrogen-rich gas and air in the mixing channel, a method of supplying air to the mixing channel in which the hydrogen-rich gas flows is known (refer to, for example, Patent Document 1).

FIGS. 1A and 1B are cross sectional views of a mixing channel in a fuel treatment device already proposed (refer to, for example, Patent Document 1).

As shown in FIGS. 1A and 1B, mixing channel 10 connects converting section 20 and selective oxidizing section 30. Mixing channel 10 is also connected to an air supply pipe (40, 41). The air supply pipe (40, 41) extends to the center of a transverse section of mixing channel 10. Broken-line arrows in FIGS. 1A and 1B show the flow of the hydrogen-rich gas, and solid-line arrows show the flow of air.

As shown in FIG. 1A, by supplying air into mixing channel 10 in which hydrogen-rich gas flows via the air supply pipe 40, the hydrogen-rich gas and air can be mixed. As shown in FIG. 1B, by supplying air into mixing channel 10 in which the hydrogen-rich gas flows via a plurality of openings 42 formed at an end of air supply pipe 41, the hydrogen-rich gas and the air can be mixed.

Since the air supply pipe extends to the center of the transverse section of mixing channel 10, air is supplied to the center of the transverse section of mixing channel 10 at which flow velocity of the hydrogen-rich gas is fast, and mixing of the hydrogen-rich gas with air can be promoted.

Normally, the flow rate of the hydrogen-rich gas flowing in mixing channel 10 is about 20 times as high as that of air supplied from the air supply pipe.

As described above, when the flow rate of the hydrogen-rich gas flowing in the mixing channel is high and the flow rate of air supplied is low, the flow velocity of air is low, and an eddy formed in the mixing channel by supply of air is small. When an eddy formed is small, the hydrogen-rich gas and air are not sufficiently mixed in the mixing channel.

Although it is also considered to make an air ejection hole small in order to increase the flow velocity of air, in this case, pressure loss increases.

Since the flow rate of the hydrogen-rich gas is high as described above, the method of supplying air in the mixing channel in which the hydrogen-rich gas flows as shown in FIGS. 1A and 1B also has a problem that the pressure loss becomes large.

As described above, the method of supplying air into the mixing channel in which the hydrogen-rich gas flows as shown in FIGS. 1A and 1B has problems that mixing of the hydrogen-rich gas with air is insufficient and that the pressure loss is large.

To solve such problems, a method of supplying the hydrogen-rich gas into the mixing channel in which air flows has been proposed (refer to, for example, Patent Document 2). FIG. 2 is a perspective view of mixing channel 10 in a fuel treatment device disclosed in Patent Document 2.

As shown in FIG. 2, mixing channel 10 passes through room 50 filled with the hydrogen-rich gas and has a plurality of gas supply ports 11. The gas supply ports are formed over the entire length of mixing channel 10. The upstream end of mixing channel 10 is connected to the air supply section, and the downstream end of mixing channel 10 is connected to the selective oxidizing section.

A step of mixing the hydrogen-rich gas with air in mixing channel 10 shown in FIG. 2 will now be described. First, air is supplied from the air supplying section into mixing channel 10. Then, the hydrogen-rich gas is supplied into mixing channel 10 via gas supply ports 11 provided in the mixing channel.

In the method to supply the hydrogen-rich gas into the mixing channel in which air flows as shown in FIG. 2, the hydrogen-rich gas having high flow rate is supplied into the mixing channel in which air having low flow rate flows, so that the hydrogen-rich gas is supplied into the mixing channel at high flow velocity. Consequently, as compared with the mixing channel shown in FIGS. 1A and 1B, the hydrogen-rich gas and air can be mixed more efficiently.

PRIOR ART DOCUMENTS

Patent Documents

Patent Document 1: Japanese Patent Application Laid-Open No. 2003-226504

Patent Document 2: Japanese Patent Application Laid-Open No. 2004-262725

DISCLOSURE OF INVENTION

Problems to be Solved by the Invention

However, the mixing channel as shown in FIG. 2 also has a problem that the hydrogen-rich gas and air are not mixed sufficiently. In particular, in the case of decreasing the supply amount of the hydrogen-rich gas in order to suppress pressure loss, the hydrogen-rich gas and air are not sufficiently mixed in the mixing channel as shown in FIG. 2. When mixing of the hydrogen-rich gas with air in the mixing channel is not sufficient, even if the supply amount of air is increased, carbon monoxide in the hydrogen-rich gas is not oxidized by the selective oxidizing section, and the carbon monoxide concentration in fuel gas increases. When the carbon monoxide concentration in the fuel gas increases, the catalyst of a fuel cell is poisoned.

An object of the present invention is to provide a fuel treatment device having a mixing channel capable of effectively mixing hydrogen-rich gas with air with low pressure loss and capable of producing a fuel gas having low carbon monoxide.

Means for Solving the Problem

The inventor of the present invention has found out that, by dividing a mixing channel into a region to which the hydrogen-rich gas is supplied and a region for mixing the hydrogen-rich gas with air by making the hydrogen-rich gas and air diffused, and by properly selecting the length of the region for mixing the hydrogen-rich gas with air, the hydrogen-rich gas and air can be sufficiently mixed. The inventor further examined and completed the present invention.

That is, the present invention relates to the following fuel treatment device.

[1] A fuel treatment device including: a reforming section that produces a hydrogen-rich gas containing carbon monoxide and water; a converting section that produces a hydrogen-rich gas containing a lower concentration of carbon monoxide by reacting the carbon monoxide and the water in the hydrogen-rich gas; a mixing channel that produces a mixed gas by mixing the hydrogen-rich gas containing the lower concentration of the carbon monoxide with air containing oxygen; an air supplying section that is connected to an upstream end of the mixing channel and supplies the air to the mixing channel; and a selective oxidizing section that is connected to a downstream end of the mixing channel and converts the mixed gas into a fuel gas by reacting the carbon monoxide and the oxygen in the mixed gas, wherein the mixing channel includes a gas supply region at the upstream side and a gas diffusion region at the downstream side, and has two or more gas supply ports connecting the gas supply region with the converting section, and a length of the gas diffusion region is 0.5 to 2 times a length of the gas supply region.

[2] The fuel treatment device as described in [1], wherein the two or more gas supply ports are aligned along a long axis of the mixing channel, and a circumferential position of one of the two or more gas supply ports and that of another one of the two or more gas supply ports are different from each other.

[3] The fuel treatment device as described in [2], wherein among the two or more gas supply ports, one gas supply port is diagonally opposite to another gas supply port.

[4] The fuel treatment device as described in any of [1] to [3], wherein among the two or more gas supply ports, a diameter of the gas supply port on the uppermost side is the largest, and a diameter of the gas supply port on the lowermost side is the smallest.

[5] The fuel treatment device as described in any of [1] to [4], further including two or more barriers provided in the mixing channel, wherein the barriers interrupt a part of flow of gas in the mixing channel near the gas supply ports.

[6] The fuel treatment device as described in any of [1] to [5], wherein a diameter of the gas supply port is narrowed toward the mixing channel.

Advantageous Effects of the Invention

According to the present invention, the hydrogen-rich gas and air are sufficiently mixed in the mixing channel, so that carbon monoxide in the hydrogen-rich gas can be efficiently oxidized in the selective oxidizing section. Consequently, the fuel treatment device of the present invention can produce a fuel gas of low concentration of carbon monoxide.

Since gas is supplied via the plurality of gas supply ports into the mixing channel in which air flows, the flow velocity at the upstream side of the mixing channel can be suppressed to be low. Consequently, as compared with the case where the hydrogen-rich gas flows in the mixing channel at once, a pressure loss can be reduced.

BEST MODE FOR CARRYING OUT THE INVENTION

Figure 1A:
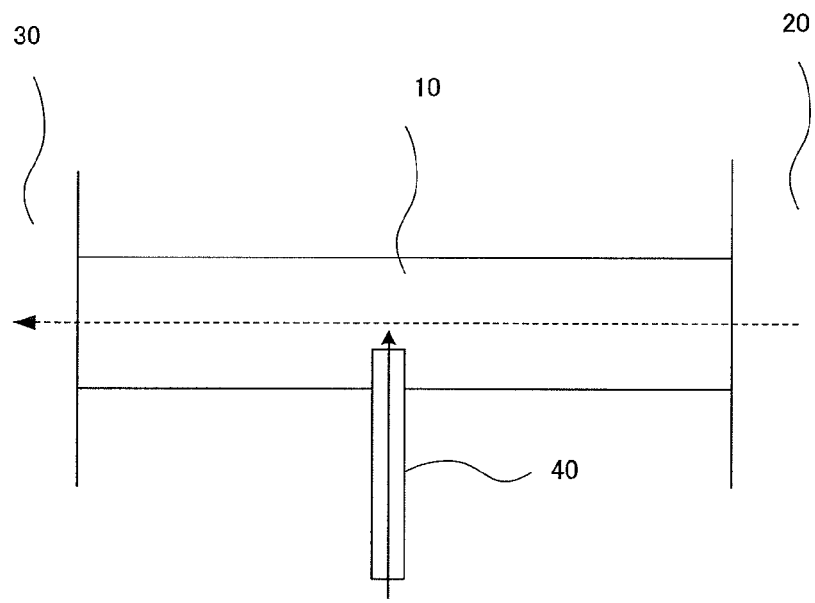
FIGS. 1A and 1B are cross sectional views of mixing channels in conventional fuel treatment device.
Figure 1B:
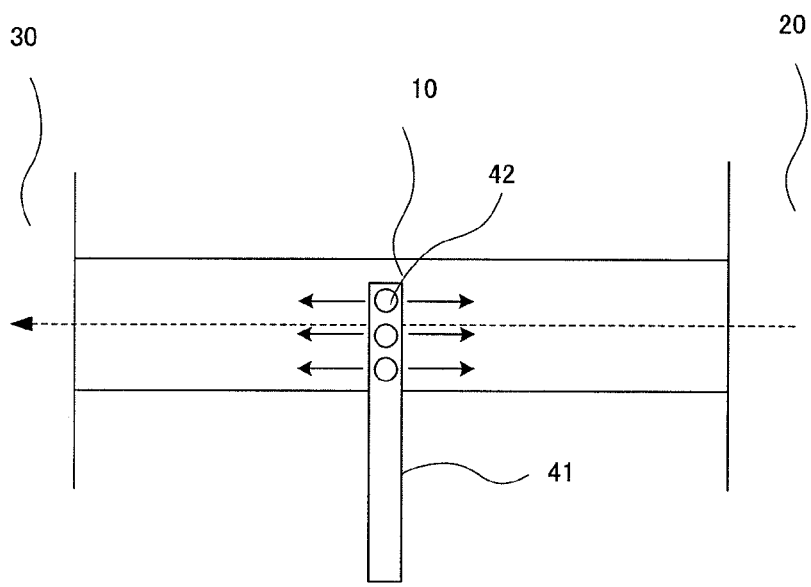

A fuel treatment device according to the present invention produces a fuel gas for a fuel cell by causing steam-reforming reaction between a raw material gas containing a carbonized fuel or alcohol and steam.

The fuel treatment device according to the present invention includes a burning section, an evaporating section, a reforming section, a converting section, an air supplying section, a mixing channel, and a selective oxidizing section.

The burning section is a unit for heating the reforming section and the evaporating section. The burning section is not limited as long as it can produce a flame and may be, for example, a burner.

The evaporating section is a unit for evaporating water to produce steam and mixing a raw material gas and the steam. The evaporating section evaporates water to produce steam by heat from the burning section, the reforming section, the converting section, and the selective oxidizing section. The produced steam is mixed with the raw material gas in the evaporating section.

The reforming section is a unit including a ruthenium-based or nickel-based catalyst and for producing hydrogen-rich gas by steam-reforming reaction from the raw material gas and the steam supplied from the evaporating section. The hydrogen-rich gas produced by the reforming section contains carbon monoxide and steam. The carbon monoxide concentration in the hydrogen-rich gas produced by the reforming section is, for example, 7 to 13%.

The converting section is a unit for producing hydrogen-rich gas containing the lower concentration of carbon monoxide from the hydrogen-rich gas produced by the reforming section. The converting section includes a platinum-based or copper/zinc-based catalyst, and produces carbon dioxide and hydrogen by shift reaction from carbon monoxide and water in the hydrogen-rich gas produced by the reforming section. "Lower concentration of carbon monoxide" refers to a concentration of carbon monoxide of 0.5% or less.

The mixing channel is a passage for mixing the hydrogen-rich gas having a lower concentration of carbon monoxide produced by the converting section with air, thereby producing a mixed gas. The mixing channel is a region constructed by, for example, a circular tube or rectangular tube. The mixing channel is, preferably, a tubular region constructed by a circular tube. The upstream end of the mixing channel is connected to an air supplying section that supplies air into the mixing channel. The air supplying section is, for example, a pump or the like. The downstream end of the mixing channel is connected to the selective oxidizing section which will be described later.

The mixing channel in the present invention employs a method of mixing hydrogen-rich gas with air by supplying the hydrogen-rich gas through the gas supply ports into the mixing channel in which air flows in advance. Therefore, the mixing channel in the present invention has a plurality of gas supply ports connected to the converting section. The hydrogen-rich gas that has passed through the converting section is supplied into the mixing channel through the plurality of gas supply ports. The structure of the gas supply port will be described later.

The selective oxidizing section is a unit for converting the mixed gas into a fuel gas by reacting carbon monoxide and oxygen in the mixed gas supplied from the mixing channel. In the selective oxidizing section, carbon monoxide in the mixed gas, which did not react in the converting section and remains is oxidized and converted to carbon dioxide. As a result, the concentration of carbon monoxide in the mixed gas decreases to 10 ppm or less and a fuel gas is produced.

A fuel treatment device having such a structure can be applied to a fuel cell system such as a household cogeneration system including a fuel cell stack. In such a household cogeneration system, moisture of offgas from the anode of the fuel cell stack is removed by a condenser, introduced again into the fuel treatment device, and may be used as a fuel of the burning section. The offgas from the anode may exchange heat with the reforming section.

Figure 3:
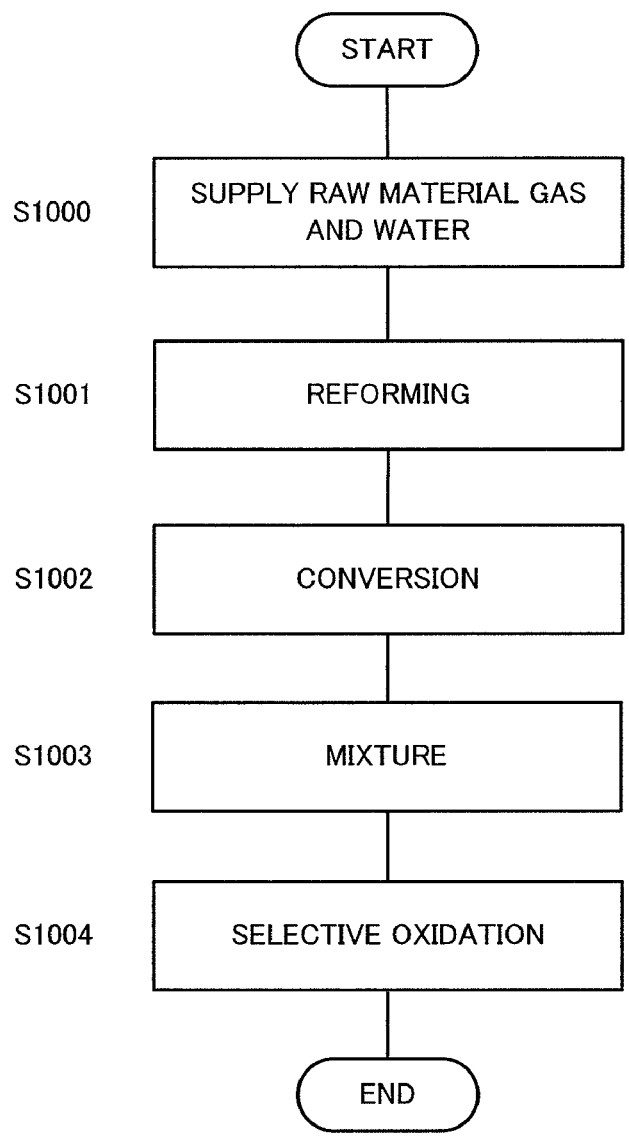
FIG. 3 shows a flow for producing fuel gas by a fuel treatment device according to the present invention.

Next, the flow of producing fuel gas by the fuel treatment device according to the present invention will be described with reference to FIG. 3.

First, water and methane as a raw material gas are supplied to the evaporating section. When water and the raw material gas are supplied to the evaporating section, water is heated in the evaporating section and becomes steam. Steam and the raw material gas are mixed in the evaporating section (S1000).

Then, the raw material gas and steam flow in the reforming section. In the reforming section, hydrogen-rich gas containing carbon monoxide is produced from the raw material gas and steam by the following steam-reforming reaction (S1001). The hydrogen-rich gas contains unreacted steam.

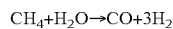
$$CH_4 + H_2O \rightarrow CO + 3H_2$$

The hydrogen-rich gas produced by the reforming section flows into the converting section. In the converting section, hydrogen-rich gas containing the lower concentration of carbon monoxide is produced from the hydrogen-rich gas produced in the reforming section by the following shift reaction (S1002).

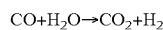
$$CO + H_2O \rightarrow CO_2 + H_2$$

The hydrogen-rich gas containing the lower concentration of carbon monoxide produced by the converting section flows into the mixing channel in which the air supplied from the air supply section flows in advance via the gas supply ports. In the mixing channel, the hydrogen-rich gas containing the lower concentration of carbon monoxide is mixed with air, thereby mixed gas is produced (S1003).

The mixed gas produced in the mixing channel flows into the selective oxidizing section. In the selective oxidizing section, a reaction occurs between oxygen in the mixed gas and carbon monoxide which is not oxidized in the converting section. As a result, the carbon monoxide is oxidized, and the concentration of the carbon monoxide in the mixed gas is decreased to 10 ppm or less (S1004). The gas that has passed through the selective oxidizing section is extracted as fuel gas.

The fuel gas produced as described above flows out from the selective oxidizing section and is supplied to a fuel cell. The fuel cell generates power using hydrogen in the fuel gas and oxidation gas containing oxygen such as air.

Figure 2:
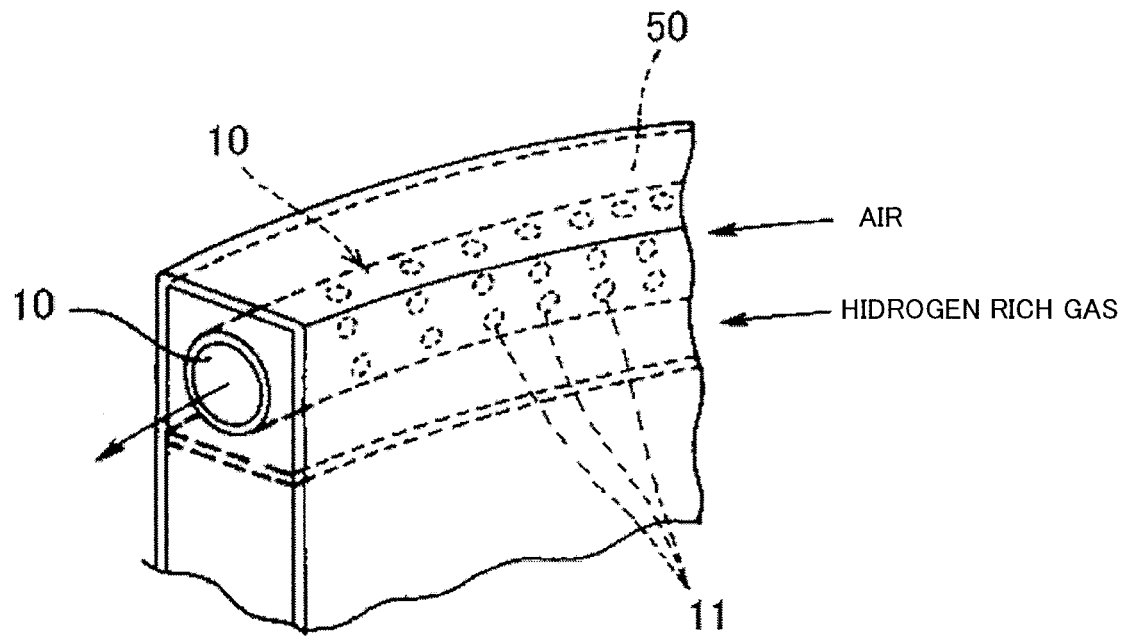
FIG. 2 is a perspective view of a mixing channel in a conventional fuel treatment device.

As described above, in step S1003, the hydrogen-rich gas that passed through the converting section and air are mixed in the mixing channel, thereby mixed gas is produced. However, in the method of making the hydrogen-rich gas flow into the mixing channel in which air flows (refer to FIG. 2), there may be a case where the hydrogen-rich gas and air are not sufficiently mixed in the mixing channel. When the hydrogen-rich gas and the air which are not sufficiently mixed flow into the selective oxidizing section, carbon monoxide in the hydrogen-rich gas is not sufficiently oxidized, and the concentration of carbon monoxide in the fuel gas increases.

The fuel treatment device according to the present invention is characterized in that hydrogen-rich gas and air can be sufficiently mixed in the mixing channel. Specifically, in the present invention, the mixing channel consists of a gas supply region at the upstream side and a gas diffusion region at the downstream side, and has two or more gas supply ports connecting the gas supply region with the converting section. That is, in the present invention, the gas supply region is connected to the converting section via the gas supply ports, and the gas diffusion region does not have gas supply ports.

The gas supply region is a region to which the hydrogen-rich gas is supplied in the mixing channel. The gas supply region is connected to the converting section via the plurality of gas supply ports. Therefore, the hydrogen-rich gas containing the lower concentration of carbon monoxide produced by the converting section passes through the gas supply ports and flows into the gas supply region in the mixing channel.

The number of gas supply ports is, although not limited, for example, 2 to 6. The diameter of the gas supply port can be properly selected according to the length and the diameter of the mixing channel and is, for example, 2 to 5 mm. The gas supply ports are preferably aligned at predetermined intervals along the long axis of the mixing channel. The circumferential positions (the positions in the circumferential direction of the mixing channel) of the gas supply ports may be the same (refer to Embodiment 1) or may be different from each other (refer to Embodiment 2).

When the circumferential positions of the gas supply ports are different from each other, one gas supply port is preferably diagonally opposite to the other gas supply port (refer to Embodiment 2). By making the circumferential positions of the gas supply ports different from each other, agitation of the hydrogen-rich gas and air can be promoted.

Preferably, the diameter of the gas supply port on the most-upstream side is the maximum, and the diameter of the gas supply port on the most-downstream side is the minimum (refer to Embodiment 3). More specifically, the diameter of the gas supply port preferably gradually decreases along the direction of gas flowing in the mixing channel.

The gas diffusion region does not have a gas supply port and is a region for assuring time for sufficiently mixing the hydrogen-rich gas with air by a diffusion effect. Therefore, the gas diffusion region is designed so that predetermined time is required until the hydrogen-rich gas and air that have passed through the gas supply region reach the selective oxidizing section. With the design, the hydrogen-rich gas and air that have passed through the gas supply region are sufficiently mixed by the diffusion effect while flowing in the gas diffusion region.

Specifically, the gas diffusion region has a predetermined volume so that it takes predetermined time for the hydrogen-rich gas and air that have passed through the gas supply region to reach the selective oxidizing section. To assure a certain volume of the gas diffusion region, the length of the gas diffusion region may be adjusted, or the diameter of the gas diffusion region may be adjusted. Preferably, the length of the gas diffusion region is adjusted. For example, if the volume of the gas diffusion region is adjusted by increasing the diameter of the gas diffusion region, the flow velocity of the hydrogen-rich gas and air flowing in the mixing channel in the gas diffusion region decreases, and the hydrogen-rich gas and air are less mixed.

In the case where the length of the gas diffusion region is adjusted, preferably, the length of the gas diffusion region is properly selected according to the nature of the gas, the diameter of the mixing channel, and the like. Specifically, when the diameter of the mixing channel is D (m), the flow velocity of gas (hydrogen-rich gas and air) flowing in the gas diffusion region is U (m/sec), and time required to diffuse the gas by one meter is t (second/m), preferably, the length L of the gas diffusion region is defined by the following equation.

$$L = U \times D \times t$$

The length of the gas diffusion region satisfying the equation is usually 0.5 to 2 times the length of the gas supply region.

If the length of the gas diffusion region is less than 0.5 times the length of the gas supply region, there may be a case where the hydrogen-rich gas and air are not sufficiently mixed in the gas diffusion region. On the other hand, if the length of the gas diffusion region is larger than 2 times the length of the gas supply region, the size of the device becomes too large. In addition, if the length of the gas diffusion region is larger than 2 times the length of the gas supply region, the temperature of the mixed gas may decrease, resulting in that oxidation reaction of carbon monoxide becomes insufficient in the selective oxidizing section. Still further, if the length of the gas diffusion region is larger than 2 times the gas supply region, a pressure loss becomes large.

That is, in the fuel treatment device of the present invention, hydrogen-rich gas having a lower concentration of carbon monoxide produced in the converting section 1) passes through the gas supply ports, flows into the gas supply region where air flows, and is agitated with air to some degree, 2) is mixed with air sufficiently while passing through the gas diffusion region, to produce mixed gas. The produced mixed gas flows into the selective oxidizing section.

As described above, in the present invention, the hydrogen-rich gas and air pass through the gas diffusion region having no gas supply ports. Consequently, even if mixing of the hydrogen-rich gas with air in the gas supply region is insufficient, the hydrogen-rich gas is sufficiently mixed with air, in the process of passing through the gas diffusion region, and mixed gas is produced.

As described above, by dividing the mixing channel into the gas supply region and the gas diffusion region; and setting the length of the gas diffusion region to 0.5 to 2 times the length of the gas supply region, the hydrogen-rich gas and air can be sufficiently mixed in the mixing channel and mixed gas having uniform ratio of hydrogen-rich gas and air can be supplied to the selective oxidizing section. Consequently, the fuel treatment device of the present invention can stably supply fuel gas even in the case where the amount of hydrogen-rich gas produced and air fluctuate according to an operation state of a fuel cell.

Since gas is supplied through the plurality of gas supply ports into the mixing channel in which air flows, the flow velocity at the upstream side of the mixing channel can be suppressed to be low. As compared with the case where the hydrogen-rich gas flows into a mixing channel through only one supply port, a pressure loss can be reduced (refer to Embodiment 1).

Embodiments of the present invention will be described below with reference to the drawings.

(Embodiment 1)

Figure 4:
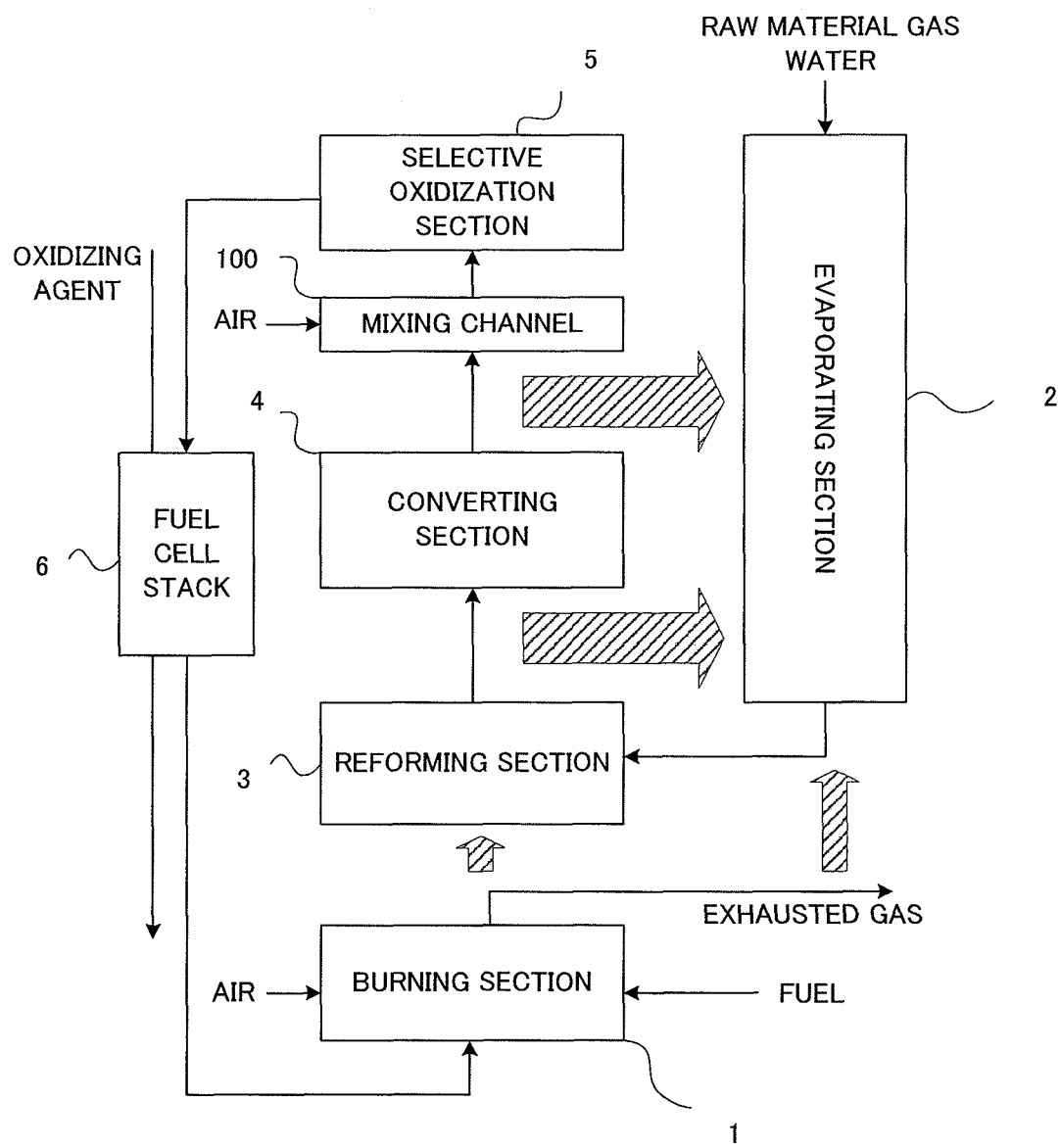
FIG. 4 is a block diagram of a fuel treatment device of Embodiment 1.
Figure 5:
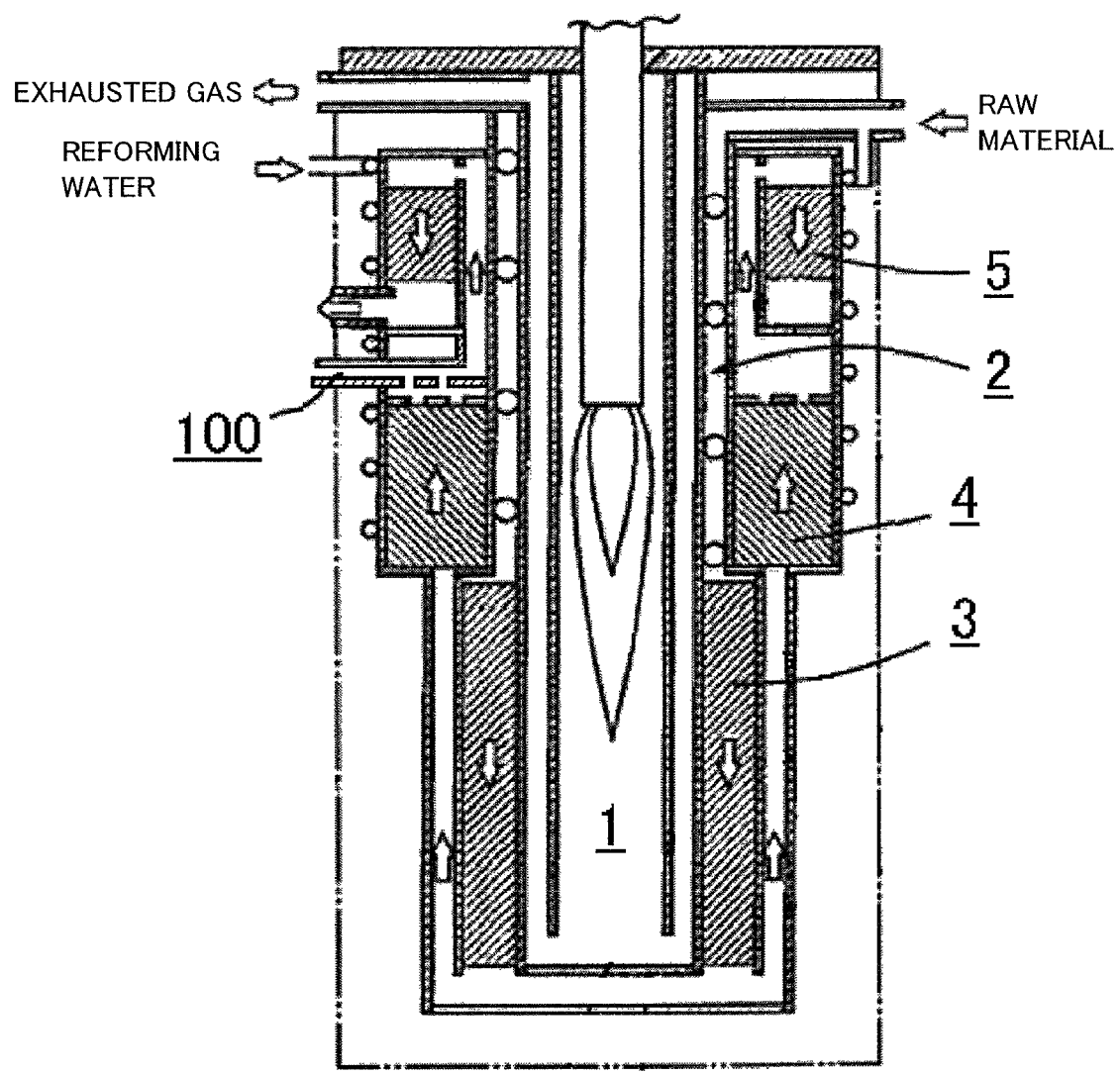
FIG. 5 is a cross sectional view of the fuel treatment device of Embodiment 1.

FIG. 4 is a schematic diagram of a fuel treatment device of Embodiment 1. FIG. 5 is a cross sectional view of the fuel treatment device of Embodiment 1. Hatched arrows in FIG. 4 show transfer of thermal energy, and solid-line arrows in FIGS. 4 and 5 show flows of gases (raw material gas, steam or hydrogen-rich gas).

As shown in FIGS. 4 and 5, the fuel treatment device of Embodiment 1 has burning section 1, evaporating section 2, reforming section 3, converting section 4, mixing channel 100, and selective oxidizing section 5.

As shown in FIG. 4, the fuel treatment device may be connected to fuel cell stack 6. When the fuel treatment device is connected to fuel cell stack 6, fuel gas converted from the mixed gas in selective oxidizing section 5 is supplied to the anode of fuel cell stack 6, and offgas of the anode of fuel cell stack 6 is supplied to burning section 1 via a condenser (not shown).

The fuel treatment device of Embodiment 1 is characterized by the structure of mixing channel 100. The structure of mixing channel 100 will be described in detail below.

Figure 6:
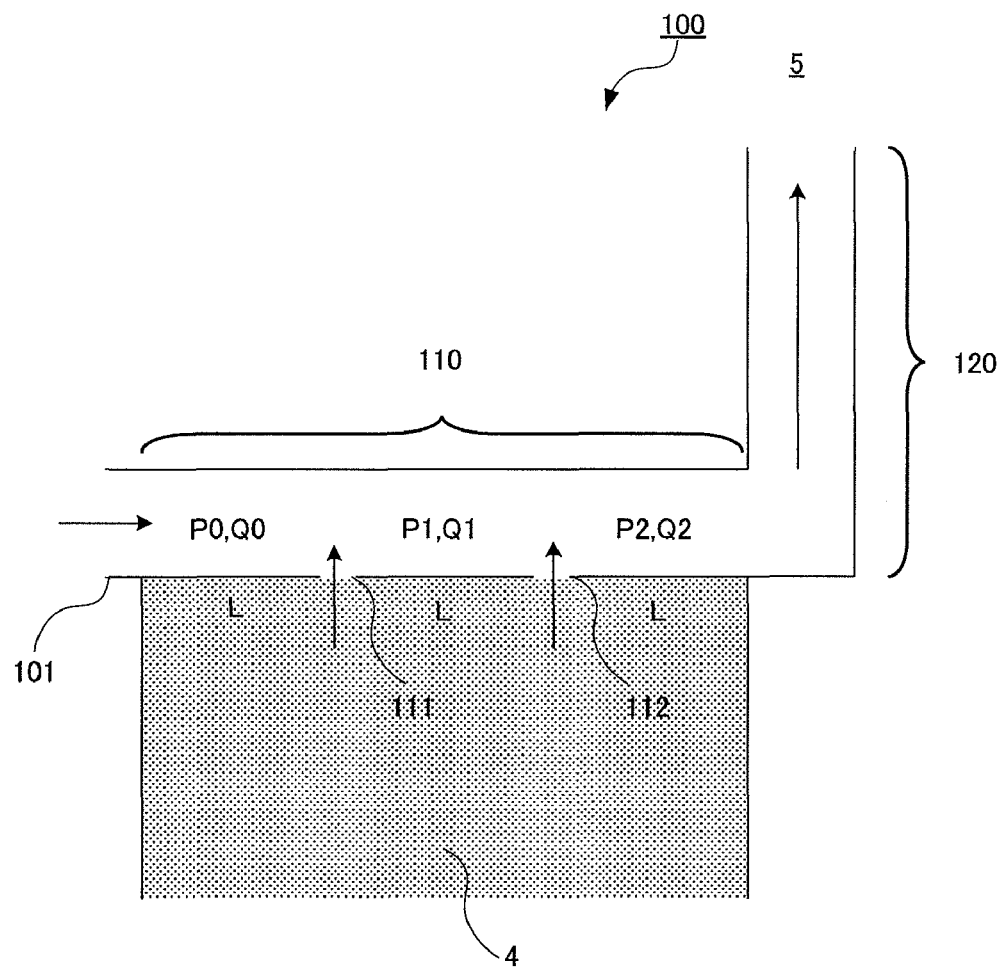
FIG. 6 is a cross sectional view of a mixing channel of Embodiment 1.

FIG. 6 is an enlarged diagram of mixing channel 100 of the fuel treatment device shown in FIG. 5. The total length of mixing channel 100 is, for example, 100 to 200 mm. The diameter of mixing channel 100 is properly selected based on an output of a fuel cell system. For example, when output of the fuel cell system is 750 W, the area of the cross section of mixing channel 100 is 12 to 50 mm$^2$. As shown in FIG. 6, mixing channel 100 includes gas supply region 110 and gas diffusion region 120.

The length of gas supply region 110 is, for example, 50 to 100 mm. The length of gas diffusion region 120 is, for example, 50 to 100 mm. By setting the length of gas diffusion region 120 to 0.5 to 2 times the length of gas supply region 110, the hydrogen-rich gas and air can be sufficiently mixed in mixing channel 100 (which will be described later).

Gas supply region 110 is connected to air inflow port 101, and has first gas supply port 111 and second gas supply port 112. The interval between air inflow port 101 and first gas supply port 111, the interval between first gas supply port 111 and second gas supply port 112, and the interval between second gas supply port 112 and the downstream end of gas supply region 110 are equal to one another.

On the other hand, gas diffusion region 120 has no gas supply ports. When the output of the fuel cell system is 750 W, the area of the gas supply port is, for example, 12 to 40 mm².

The behavior of hydrogen-rich gas and air flowing in mixing channel 100 will now be described. Arrows in FIG. 6 show the flow of the air and hydrogen-rich gas.

As shown in FIG. 6, air supplied from air inflow port 101 flows in advance in gas supply region 110. The hydrogen-rich gas that has passed through converting section 4 passes through first and second gas supply ports 111 and 112, and flows into gas supply region 110. The flow rate of the hydrogen-rich gas is about 20 times as high as that of air.

Since the hydrogen-rich gas having high flow rate flows via the gas supply ports into gas supply region 110 in which air having low flow rate flows in this embodiment, the inflow velocity of the hydrogen-rich gas is high, the hydrogen-rich gas produces an eddy in gas supply region 110 to promote agitation of the hydrogen-rich gas and air in gas supply region 110.

The hydrogen-rich gas and air agitated to some degree in gas supply region 110 flow into gas diffusion region 120. The length of gas diffusion region 120 is set so that time for which hydrogen-rich gas and air are mixed sufficiently by the diffusion effect can be assured. Therefore, hydrogen-rich gas and air can be sufficiently mixed by the diffusion effect while flowing in gas diffusion region 120.

According to this embodiment, as described above, by dividing the mixing channel into the gas supply region and the gas diffusion region and setting the length of the gas diffusion region to about 0.5 to 2 times the length of the gas supply region, the hydrogen-rich gas and air can be sufficiently mixed in the mixing channel. Consequently, the mixed gas having uniform ratio of the hydrogen-rich gas and air can be supplied to the selective oxidizing section.

By providing two gas supply ports for the hydrogen-rich gas, the pressure loss can be reduced as compared with the case where the number of gas supply port for the hydrogen-rich gas is one. The relation between provision of two gas supply ports and reduction in the pressure loss will be described below.

Pressure loss P of entire gas supply region 110 is defined as the following equation (1) where pressure loss between air inflow port 101 and first gas supply port 111 is P0; pressure loss between first gas supply port 111 and the second gas supply port is P1; and pressure loss between second gas supply port 112 and the downstream end of gas supply region 110 is P2.

$$P=P0+P1+P2 \qquad (1)$$

The pressure loss is proportional to the flow rate of gas in the case of laminar flow. Therefore, when the flow rate of gas between air inflow port 101 and first gas supply port 111 is Q0; the flow rate of gas between first gas supply port 111 and the second gas supply port is Q1; the flow rate of gas between second gas supply port 112 and the downstream end of gas supply region 110 is Q2; and it is assumed that a uniform amount of the hydrogen-rich gas is supplied from each of the first and second gas supply ports, the pressure losses (P0, P1, and P2) are defined as the following equations (2).

$$P0=\alpha \times Q0 \times L$$

$$P1=\beta \times Q1 \times L$$

$$P2=\beta \times Q2 \times L$$

$$Q2=2 \times Q1+Q0 \qquad (2)$$

where L represents a length of ⅓ of the total length of gas supply region 110, and a and 13 represent functions of viscosity of gas and the passage width, respectively. Since the flow rate of air is about ¹/₂₀ of the flow rate of the hydrogen-rich gas, it may be approximated to 0. Therefore, the flow rate of gas can be defined as the following equation (3).

$$Q0 \approx 0$$

$$Q2=2 \times Q1 \qquad (3)$$

Therefore, the pressure loss P of gas supply region 110 in the case where gas supply region 110 has two gas supply ports can be defined as the following equation (4).

$$P=3 \times \beta Q1 \times L \qquad (4)$$

On the other hand, in the case where gas supply region 110 does not have second gas supply port 112 and the hydrogen-rich gas is supplied only from first gas supply port 111, the flow rate of gas in gas supply region 110 at the downstream side of first gas supply port 111 becomes constant. Consequently, pressure loss P' in gas supply region 110 is defined as the following equation (5).

$$P0=\alpha \times Q0 \times L$$

$$P1=\beta \times 2Q1 \times L$$

$$P2=\beta \times 2Q1 \times L$$

$$P'=P0+P1+P2 \qquad (5)$$

Therefore, in the case where the number of gas supply ports is one, the pressure loss P' in gas supply region 110 is defined as the following equation (6).

$$P'=4 \times \beta Q1 \times L \qquad (6)$$

According to the equations (4) and (6), in the case where two gas supply ports are provided, the pressure loss can be set to about ¾ of that in the case where the number of gas supply port is only one. In the case where the gas supply ports are aligned at equal intervals along the flow of the mixing channel, by increasing the number of gas supply ports, the pressure loss can be further reduced.

Therefore, by using the fuel treatment device described in Embodiment 1, the hydrogen-rich gas and air can be mixed at a low pressure loss.

(Embodiment 2)

In Embodiment 1, the mode where the circumferential positions of the gas supply ports are the same has been described. In Embodiment 2, a mode where the circumferential positions of the gas supply ports are different from each other will be described.

The fuel treatment device of Embodiment 2 is the same as that of Embodiment 1 except for the alignments pattern of gas supply ports in the gas supply region. Therefore, in Embodiment 2, only the gas supply region in the mixing channel will be described.

Figure 7A:
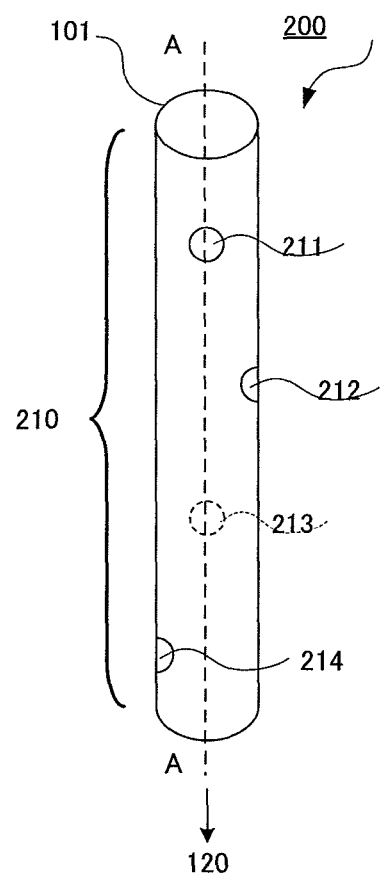
FIGS. 7A and 7B are diagrams showing a mixing channel of Embodiment 2.

FIG. 7A is a perspective view of gas supply region 210 in mixing channel 200 of Embodiment 2. As shown in FIG. 7A, gas supply region 210 is connected to air inflow port 101 and has first gas supply port 211, second gas supply port 212, third gas supply port 213, and fourth gas supply port 214. The circumferential positions of the gas supply ports are different from each other. Preferably, the interval in the circumferential direction of the mixing channel between first gas supply port 211 and second gas supply port 212, the interval in the circumferential direction of the mixing channel between second gas supply port 212 and third gas supply port 213, and the interval in the circumferential direction of the mixing channel between third gas supply port 213 and fourth gas supply port 214 are equal.

The first gas supply port 211 is diagonally opposite to third gas supply port 213. The second gas supply port 212 is diagonally opposite to fourth gas supply port 214.

Figure 7B:
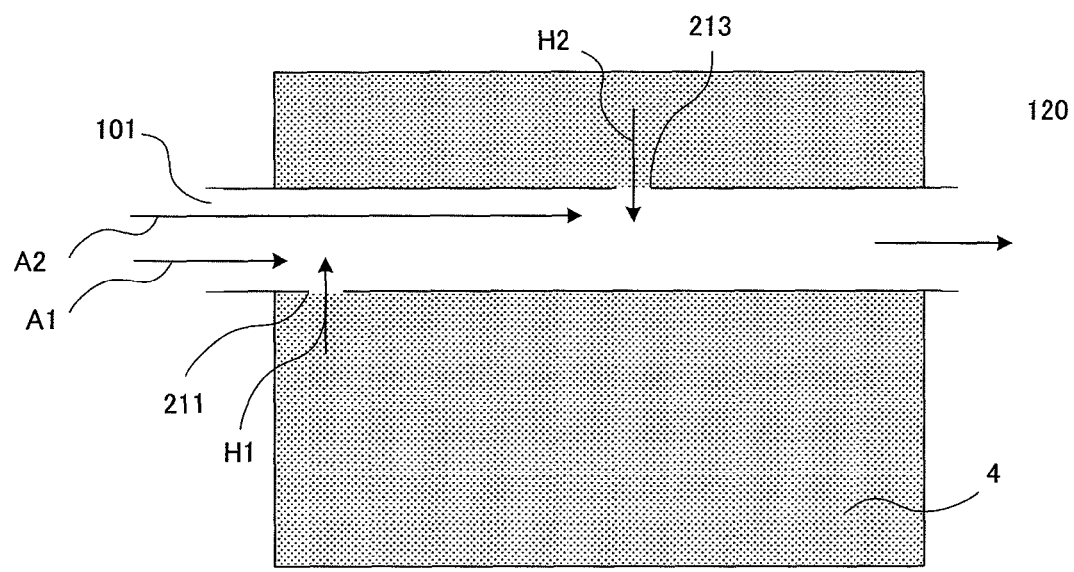

The behavior of the air and hydrogen-rich gas in gas supply region 210 will now be described. FIG. 7B is a cross sectional view of gas supply region 210 of mixing channel 200 shown in FIG. 7A taken along line A-A. Arrows in FIG. 7B show the flow of the air and hydrogen-rich gas.

As shown in FIG. 7B, air supplied from air inflow port 101 flows in advance in gas supply region 210. The hydrogen-rich gas that has passed through converting section 4 passes through first and third gas supply ports 211 and 213, and flows into gas supply region 210.

As described above, in this embodiment, the circumferential positions of the gas supply ports are different from each other. With this structure, agitation of hydrogen-rich gas and air in gas supply region 210 can be promoted. The relation between the fact that the circumferential positions of the gas supply ports are different from each other and promotion of agitation of the hydrogen-rich gas and air in gas supply region 210 will be described below.

As shown in FIG. 7B, air A1 supplied via air inflow port 101 is agitated with hydrogen-rich gas H1 that flowed in via first gas supply port 211. On the other hand, air A2 flowing along the wall face side facing first gas supply port 211 among wall faces of mixing channel 200 may not be agitated with hydrogen-rich gas H1 and pass through the region in which first gas supply port 211 is formed. In particular, in the case where the supply amount of the hydrogen-rich gas is small and the inflow velocity of the hydrogen-rich gas is slow, air A2 tends to pass without being agitated with hydrogen-rich gas H1.

However, in this embodiment, third gas supply port 213 is arranged on the wall face side facing first gas supply port 211 among the wall faces of mixing channel 200. Consequently, air A2 that passed without being mixed with hydrogen-rich gas H1 is agitated with hydrogen-rich gas H2 flowed in via third gas supply port 213.

As described above, in this embodiment, by making the circumferential positions of the gas supply ports different from one another, even if the flow rate of the hydrogen-rich gas is low, agitation of the hydrogen-rich gas and air in the gas supply region can be promoted.

(Embodiment 3)

In Embodiments 1 and 2, the modes where all of the diameters of the gas supply ports are the same has been described. In Embodiment 3, a mode where the diameters of the gas supply ports are different from one another will be described.

The fuel treatment device of Embodiment 3 is the same as that of Embodiment 1 except for the alignments pattern of gas supply ports in the gas supply region. Therefore, in Embodiment 3, only the gas supply region in the mixing channel will be described.

Figure 8A:
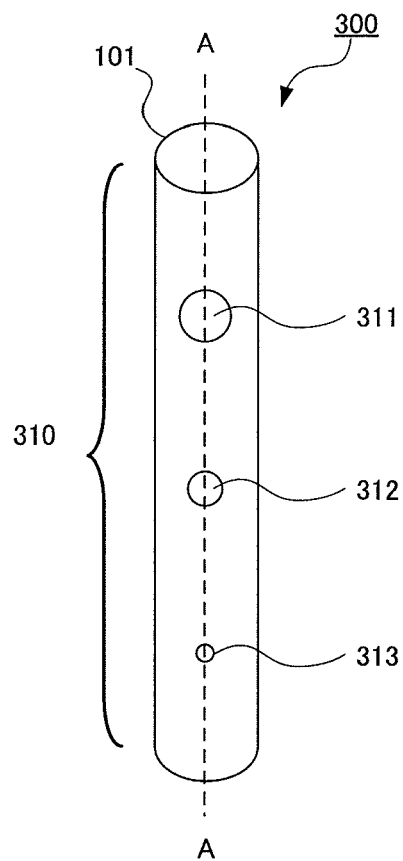
FIGS. 8A and 8B are diagrams showing a mixing channel of Embodiment 3.

FIG. 8A is a perspective view of gas supply region 310 in mixing channel 300 of Embodiment 3. As shown in FIG. 8A, gas supply region 310 is connected to air inflow port 101 and has first gas supply port 311, second gas supply port 312, and third gas supply port 313. The diameter of first gas supply port 311 at the upstream side of mixing channel 300 is the largest, and the diameter of third gas supply port 313 at the downstream side is the smallest. As described above, this embodiment is characterized in that the diameter of the gas supply ports decreases gradually along the flow direction of gas in mixing channel 300.

Figure 8B:
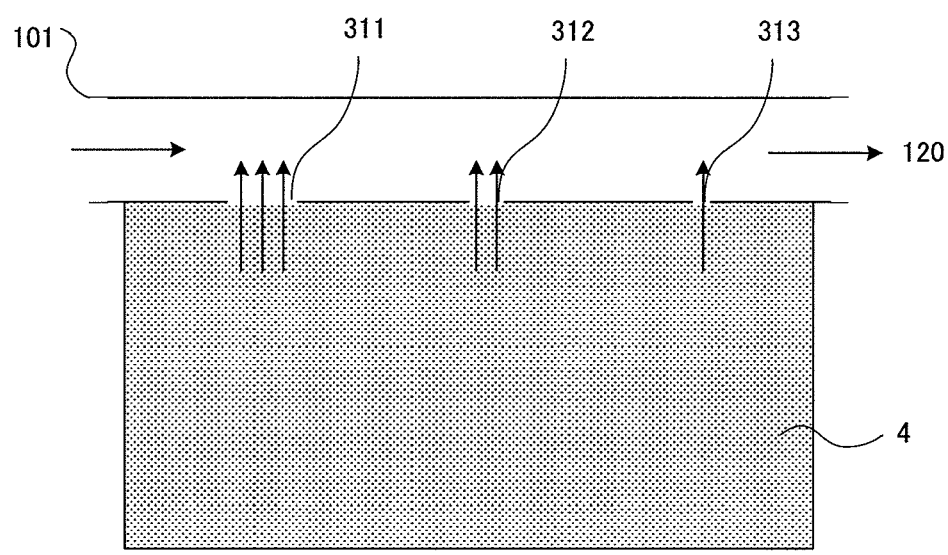

The behavior of the air and hydrogen-rich gas in gas supply region 310 will now be described. FIG. 8B is a cross sectional view of gas supply region 310 of mixing channel 300 shown in FIG. 8A taken along line A-A. Arrows in FIG. 8B show the flow of the air and hydrogen-rich gas.

As shown in FIG. 8B, air supplied from air inflow port 101 flows in advance in gas supply region 310. The hydrogen-rich gas that has passed through converting section 4 passes through first, second, and third gas supply ports 311, 312, and 313, and flows into gas supply region 310.

As described above, the flow rate of air is about $\frac{1}{20}$ of the flow rate of the hydrogen-rich gas. Therefore, at the upstream side of gas supply region 310 to which the hydrogen-rich gas is not supplied, the flow rate of gas is low. As the hydrogen-rich gas flows in via the gas supply ports, the flow rate of gas increases step by step. If the flow rate of gas varies in the gas supply region, agitation of the hydrogen-rich gas and air may not be sufficiently performed in the gas supply region.

However, in this embodiment, the diameter of first gas supply port 311 at the upstream side is larger, so that the flow rate of the hydrogen-rich gas flowing in via first gas supply port 311 at the upstream side is higher while the diameter of third gas supply port 313 at the downstream side is smaller, so that the flow rate of the hydrogen-rich gas flowing in via third gas supply port 313 at the downstream side is lower. Consequently, the flow rate of gas flowing in gas supply region 310 is made uniform, and the hydrogen-rich gas and air can be agitated more effectively.

(Embodiment 4)

In Embodiment 4, a mode where the mixing channel has a plurality of barriers in the gas supply region will be described.

The fuel treatment device of Embodiment 4 is the same as that of Embodiment 1 except that the mixing channel has a plurality of barriers in the gas supply region. Therefore, in Embodiment 4, only the gas supply region in the mixing channel will be described.

Figure 9:
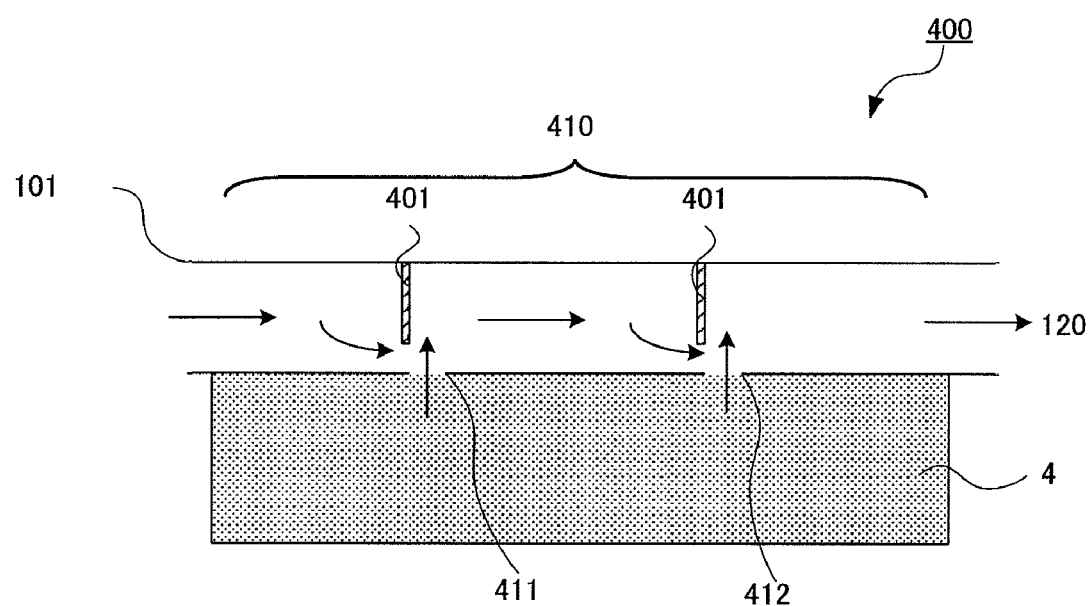
FIG. 9 is a cross sectional view of a mixing channel of Embodiment 4.

FIG. 9 is a cross sectional view of gas supply region 410 in mixing channel 400 of Embodiment 4. As shown in FIG. 9, gas supply region 410 is connected to air inflow port 101 and has a plurality of barriers 401. Barriers 401 are provided on the wall face of mixing channel 400 in a region opposed to the gas supply ports and interrupt a part of the flow of gas in mixing channel 400 near the gas supply port.

The behavior of the hydrogen-rich gas and air in gas supply region 410 will now be described. Arrows in FIG. 9 show the flow of the hydrogen-rich gas and air. As shown, in FIG. 9, air supplied from air inflow port 101 flows in advance in gas supply region 410. The hydrogen-rich gas that has passed through converting section 4 passes through first and second gas supply ports 411 and 412, and flows into gas supply region 410.

In this embodiment, air which flowed in via air inflow port 101 is led close to the gas supply ports by barriers 401 arranged close to gas supply ports (slightly upstream side). Consequently, even if the flow velocity of the hydrogen-rich gas flowing in through the gas supply port is low and an eddy is formed only close to the gas supply port, air is led close to the gas supply port by barrier 401. Thus, the hydrogen-rich gas and air can be sufficiently agitated.

(Embodiment 5)

In Embodiment 5, a mode where the diameter of the gas supply port is narrowed toward the mixing channel will be described.

The fuel treatment device of Embodiment 5 is the same as that of Embodiment 1 except that the shapes of gas supply ports provided in the gas supply region are different. Therefore, in Embodiment 5, only the gas supply region in the mixing channel will be described.

Figure 10:
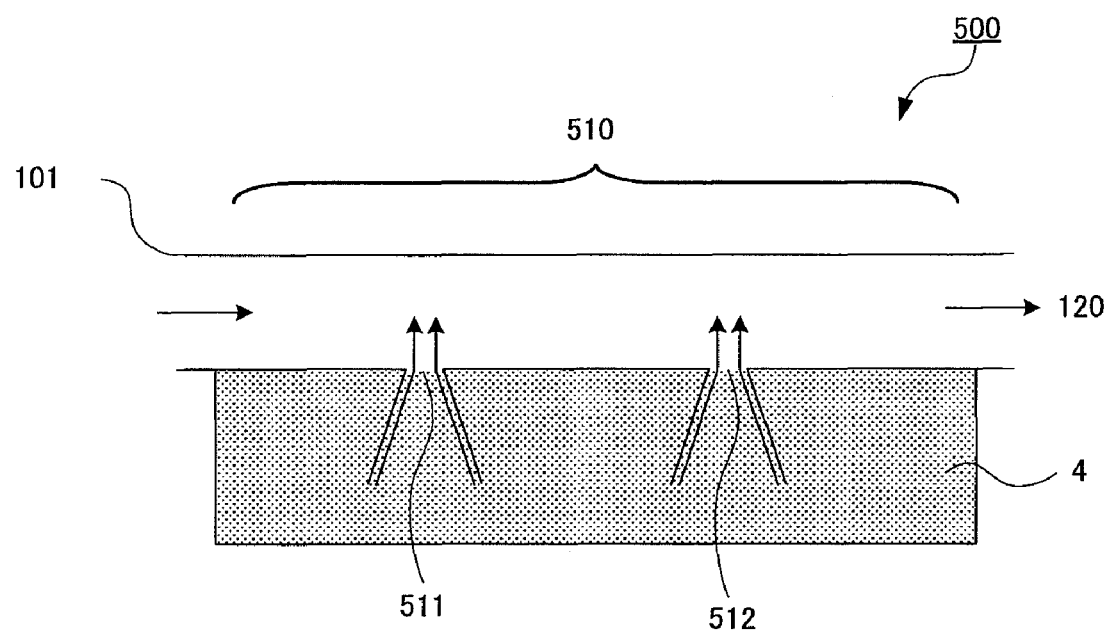
FIG. 10 is a cross sectional view of a mixing channel of Embodiment 5.

FIG. 10 is a cross sectional view of gas supply region 510 in mixing channel 500 of Embodiment 5. As shown in FIG. 10, gas supply region 510 is connected to air inflow port 101 and has first gas supply port 511 and second gas supply port 512. First and second gas supply ports 511 and 512 are narrowed toward mixing channel 500.

The behavior of the hydrogen-rich gas and air in gas supply region 510 will now be described. Arrows in FIG. 10 show the flow of the hydrogen-rich gas and air. As shown in FIG. 10, air supplied from air inflow port 101 flows in advance in gas supply region 510. The hydrogen-rich gas that has passed through converting section 4 passes through first and second gas supply ports 511 and 512, and flows in gas supply region 510.

In this embodiment, the diameter of the gas supply port is narrowed toward the mixing channel, so that the flow velocity of the hydrogen-rich gas passing through first and second gas supply ports 511 and 512 and flowing into gas supply region 510 increases. Consequently, agitation of the hydrogen-rich gas and air is promoted. Further, by increasing the flow velocity of the hydrogen-rich gas which flows in through the gas supply port, an eddy formed by inflow of the hydrogen-rich gas can be made larger, and agitation of the hydrogen-rich gas and air can be promoted.

(Embodiment 6)

In Embodiment 6, a mode where the gas supply port extends to the center of a transverse section of the mixing channel will be described.

The fuel treatment device of Embodiment 6 is the same as that of Embodiment 1 except that the shape of the gas supply port in the gas supply region is different. Therefore, in Embodiment 6, only the gas supply region in the mixing channel will be described.

Figure 11:
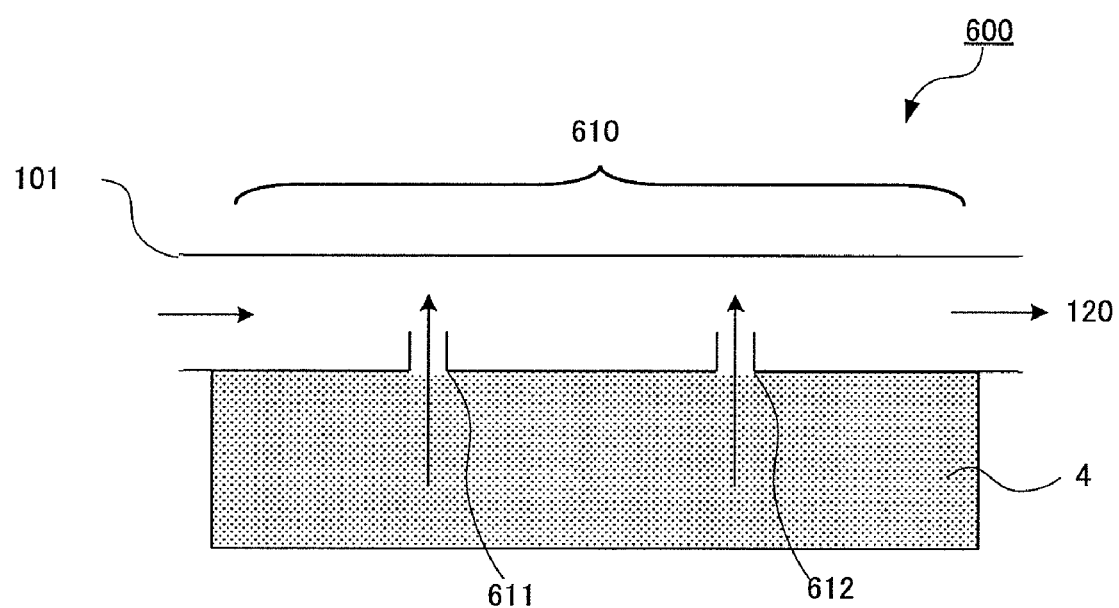
FIG. 11 is a cross sectional view of a mixing channel of Embodiment 6.

FIG. 11 is a cross sectional view of gas supply region 610 in mixing channel 600 of Embodiment 6. As shown in FIG. 11, gas supply region 610 is connected to air inflow port 101 and has first and second gas supply ports 611 and 612. First and second gas supply ports 611 and 612 extend to the center of the transverse section of mixing channel 600.

The behavior of the hydrogen-rich gas and air in gas supply region 610 will now be described. Arrows in FIG. 11 show the flow of the hydrogen-rich gas and air. As shown in FIG. 11, air supplied from air inflow port 101 flows in advance in gas supply region 510. The hydrogen-rich gas that has passed through converting section 4 passes through first and second gas supply ports 611 and 612, and flows into gas supply region 610.

The flow velocity of gas flowing in mixing channel 600, in the center of the transverse section of mixing channel 600 is higher than that near the wall face of mixing channel 600. In this embodiment, the gas supply ports extend, so that the hydrogen-rich gas that flowed in through the gas supply ports can be led to the center of the transverse section of mixing channel 600 where the flow velocity of gas is high. Thus, agitation of the hydrogen-rich gas and air can be promoted.

EXAMPLE

In Example, the behavior of the hydrogen-rich gas and air in a mixing channel of a fuel treatment device of the present invention was analyzed with computer simulation.

(Program Used)

In the simulation, FLUENT6.2 manufactured by ANSYS, Inc. was used.

(Shape of Mixing Channel)

Figure 12:
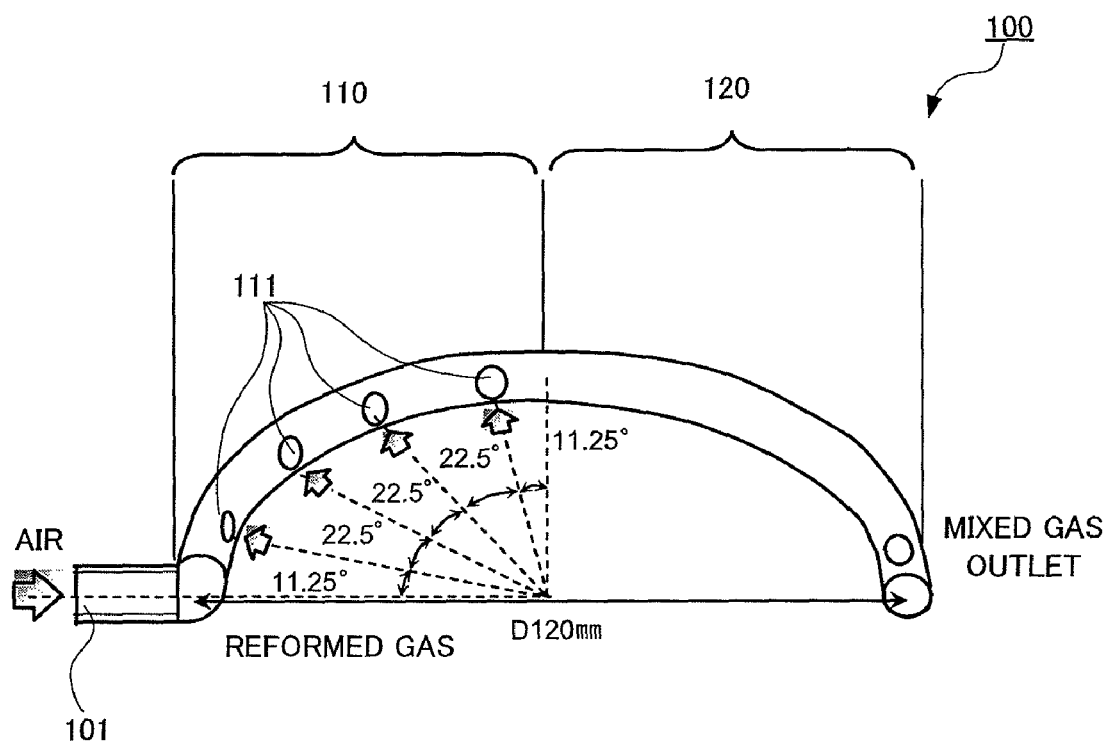
FIG. 12 is a diagram showing a shape of a mixing channel analyzed in Example.

FIG. 12 shows the shape of mixing channel 100 analyzed in Example. As shown in FIG. 12, mixing channel 100 was constructed by a circular tube having a semicircular shape. The inside diameter of the circular tube was set to 6 mm. The diameter D of the semicircle was set to 120 mm. The length of gas supply region 110 was set to 94 mm, and the length of the gas diffusion region was set to 94 mm. In gas supply region 110, gas supply ports 111 were aligned along the flow of the gas. The diameter of gas supply port 111 was set to 4 mm. Four gas supply ports were aligned at every 22.5° as shown in FIG. 12.

(Flow Rates of Air and Hydrogen-Rich Gas)

The flow rate of air was set to 0.6 L/min, and that of the hydrogen-rich gas was set to 18 L/min.

(Composition of Hydrogen-Rich Gas)

The composition of the hydrogen-rich gas was set as follows:

Methane 1.8%; steam 18.7%; carbon dioxide 15.4%; carbon monoxide 0.2%; hydrogen 63.9%.

(Measuring Positions)

Figure 13:
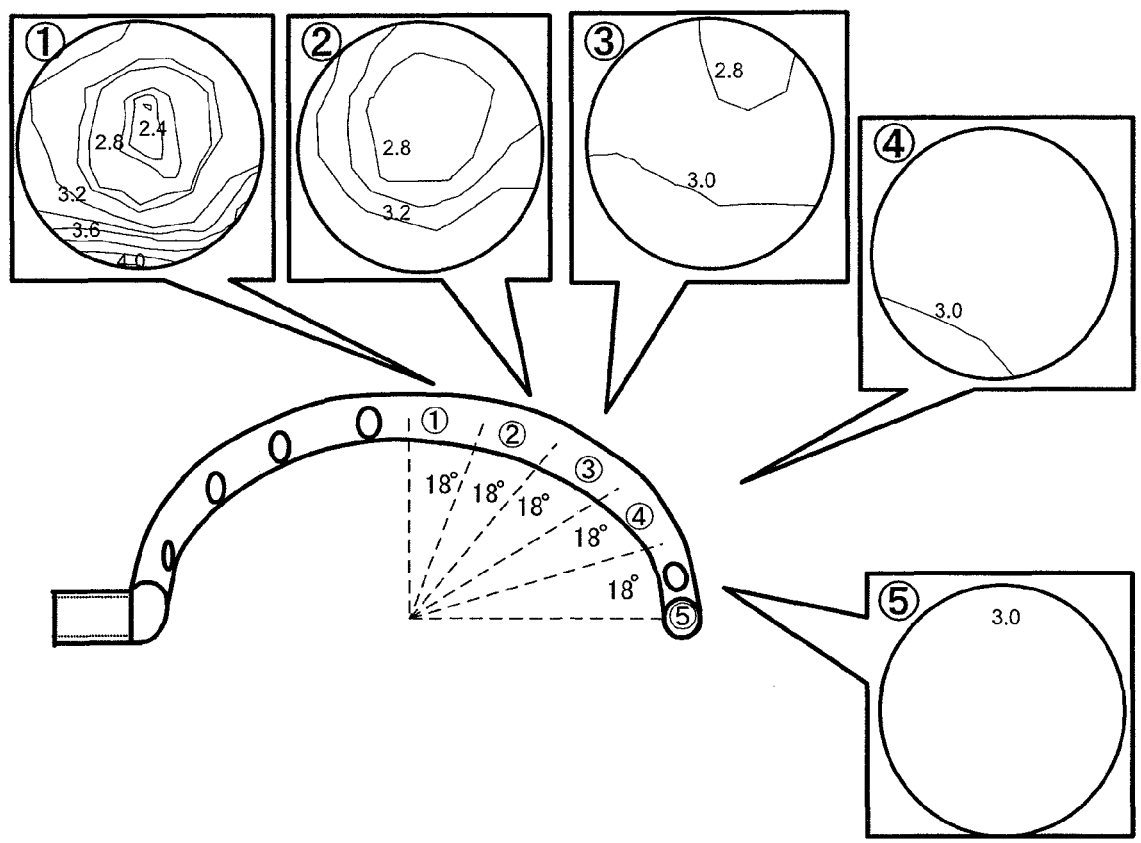
FIG. 13 is a diagram showing an analysis result of Example.

As shown in FIG. 13, the ratio between mol concentration of oxygen and mol concentration of carbon monoxide (mol concentration of oxygen/mol concentration of carbon monoxide) in a section of the gas diffusion region was measured at every 18°. Since oxygen is contained in air and carbon monoxide is contained in the hydrogen-rich gas, it is supposed that the smaller variation in the ratio between mol concentration of oxygen and mole concentration of carbon monoxide is, the more the hydrogen-rich gas and air are mixed sufficiently.

(Analysis Result)

FIG. 13 shows an analysis result of Example. As shown in FIG. 13, in section (1) of the most upstream side of the gas diffusion region, the range of variation in the ratio between mol concentration of oxygen and mol concentration of carbon monoxide was 2.4 to 4.0. On the other hand, in section (2), the range of variation in the ratio between mol concentration of oxygen and mol concentration of carbon monoxide was 2.8 to 3.2. In section (3), the range was 2.8 to 3.0. In section (5), no variation in the ratio between mol concentration of oxygen and mol concentration of carbon monoxide was observed.

The analysis result shows that mixture of hydrogen-rich gas and air is insufficient only with the gas supply region; however, as in the present invention, by providing the gas diffusion region after the gas supply region, the hydrogen-rich gas and air can be sufficiently mixed.

The present application claims the priority based on Japanese Patent Application 2008-143028 filed on May 30, 2008. The disclosure of this application is incorporated herein by reference in its entirety.

INDUSTRIAL APPLICABILITY

A fuel treatment device of the present invention can stably produce a fuel gas for a fuel cell. Consequently, a fuel treatment device of the present invention is useful for a fuel cell system such as a household cogeneration system.

DESCRIPTION OF REFERENCE NUMERALS 1 burning section
2 evaporating section
3 reforming section
4 converting section
5 selective oxidizing section
6 fuel cell stack
100, 200, 300, 400, 500, 600 mixing channel
101 air inflow port 110, 210, 310, 410, 510, 610 gas supply region
120 gas diffusion region
111, 211, 311, 411, 511, 611 first gas supply port
112, 212, 312, 412, 512, 612 second gas supply ports
213, 313 third gas supply port
214 fourth gas supply port
401 barrier

The invention claimed is:

1. A fuel treatment device, comprising:
   a reforming section that produces a hydrogen-rich gas containing carbon monoxide and water;
   a converting section that produces a hydrogen-rich gas containing a lower concentration of carbon monoxide by reacting the carbon monoxide and the water in the hydrogen-rich gas;
   a mixing channel that includes a gas supply region at an upstream side and a gas diffusion region at a downstream side, and produces a mixed gas by mixing the hydrogen-rich gas containing the lower concentration of the carbon monoxide with air containing oxygen;
   an air supplying section that is connected to an upstream end of the mixing channel and supplies air to the mixing channel; and
   a selective oxidizing section that is connected to a downstream end of the mixing channel and converting the mixed gas into a fuel gas by reacting the carbon monoxide and the oxygen in the mixed gas,
   wherein the mixing channel has two or more gas supply ports connecting the gas supply region with the converting section, and the gas diffusion region does not have the gas supply ports,
   the mixing channel includes one tube aligned in a radial direction of the fuel treatment device, and one channel aligned along a long axis of the fuel treatment device,
   the tube includes the gas supply region,
   the channel includes the gas diffusion region, and
   a length of the gas diffusion region is 0.5 to 2 times a length of the gas supply region.

2. The fuel treatment device according to claim 1,
   wherein pressure loss of entire gas diffusion region is higher than pressure loss of entire gas supply region.

3. The fuel treatment device according to claim 1,
   wherein among the two or more gas supply ports, one gas supply port is diagonally opposite to another gas supply port.

4. The fuel treatment device according to claim 1,
   wherein among the two or more gas supply ports, a diameter of the gas supply port on the uppermost side is the largest, and a diameter of the gas supply port on the lowermost side is the smallest.

5. The fuel treatment device according to claim 1, further comprising:
   two or more barriers provided in the mixing channel,
   wherein the barriers interrupt a part of flow of gas in the mixing channel near the gas supply ports.

6. The fuel treatment device according to claim 1,
   wherein a diameter of the gas supply port is narrowed toward the mixing channel.

7. The fuel treatment device according to claim 1,
   wherein a circumferential position of one of the two or more gas supply ports and a circumferential position of another one of the two or more gas supply ports are different from each other.

* * * * *